United States Patent [19]

Franet et al.

[11] Patent Number: 5,265,403
[45] Date of Patent: Nov. 30, 1993

[54] DRAFT TONGUE FOR CONNECTING PTO-DRIVEN IMPLEMENT TO DRAFT LINKS OF A TOWING VEHICLE

[75] Inventors: Roger Franet; Paul Belat, both of Sarreguemines, France

[73] Assignee: Deere & Company, Moline, Ill.

[21] Appl. No.: 944,577

[22] Filed: Sep. 14, 1992

[51] Int. Cl.⁵ .................. A01D 34/00; A01D 34/82
[52] U.S. Cl. .................... 56/15.3; 56/15.5; 280/462
[58] Field of Search ................ 56/15.3, 15.5; 180/14.4, 53.3; 280/462

[56] References Cited

U.S. PATENT DOCUMENTS

| | | | |
|---|---|---|---|
| 4,525,987 | 7/1985 | Werner et al. | 56/15.2 |
| 4,738,461 | 4/1988 | Stephenson et al. | 280/400 |
| 5,076,635 | 3/1992 | Koorn et al. | 56/15.2 |
| 5,099,635 | 3/1992 | Butkovich et al. | 56/15.2 X |

Primary Examiner—Stephen J. Novosad

[57] ABSTRACT

A draft tongue for a powered implement is designed for optionally including a first or a second coupling structure adapted for connection to draft links off a towing vehicle. The first coupling structure includes a gear transmission having an input shaft for connection, by means of an articulated power shaft, to the power take-off of the towing vehicle, and being mounted for swivelling, relative to an output shaft, about a vertical axis. The second coupling structure simply includes a support for a pin that is universally connected to an elongate member having opposite ends adapted for being coupled to the draft links of the towing vehicle.

8 Claims, 3 Drawing Sheets

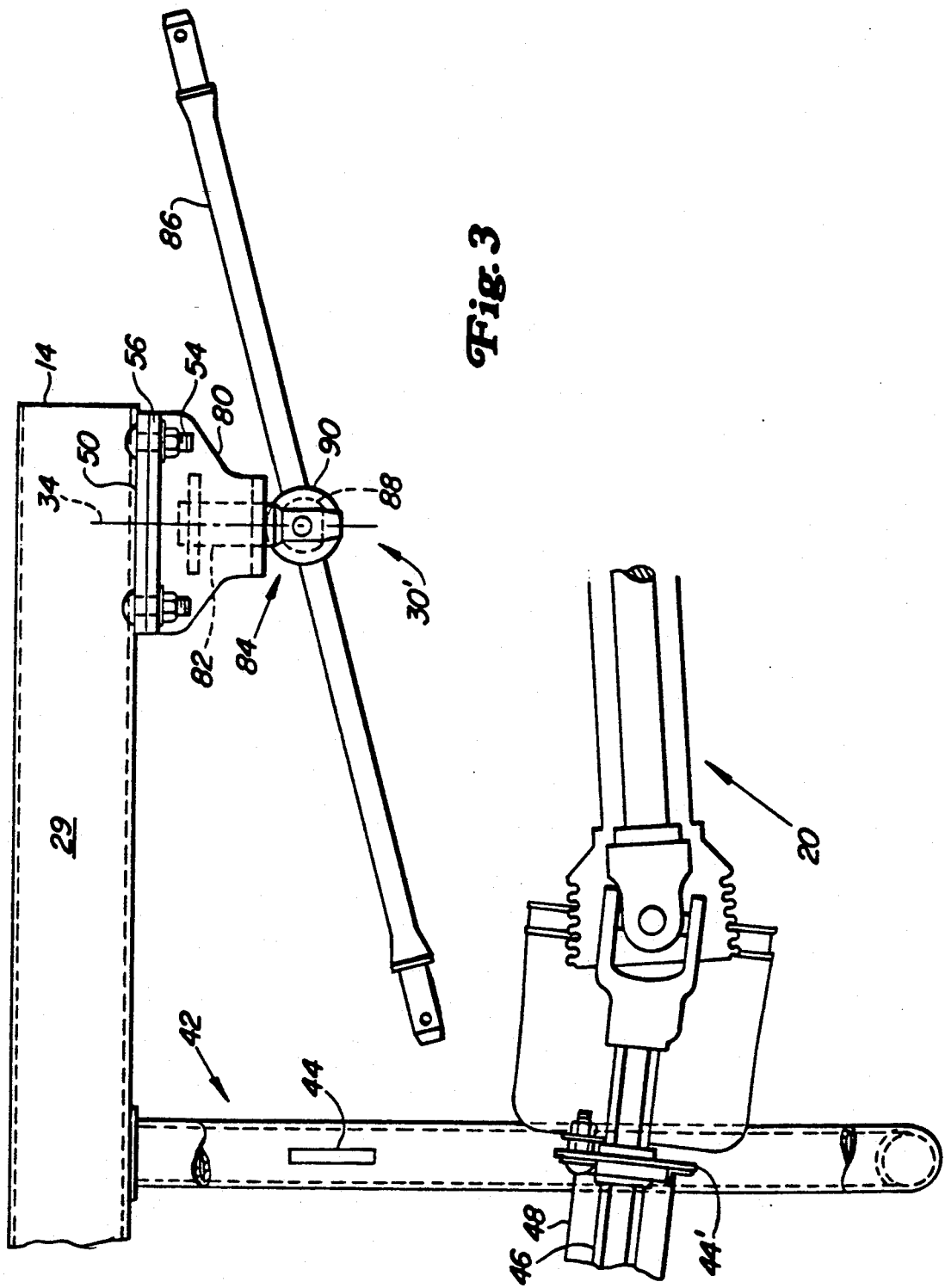

5,265,403

DRAFT TONGUE FOR CONNECTING PTO-DRIVEN IMPLEMENT TO DRAFT LINKS OF A TOWING VEHICLE

BACKGROUND OF THE INVENTION

The invention concerns a draft tongue for a power-driven machine including a power transmission shaft and a coupling arrangement, that can pivot with respect to the draft tongue and is adapted for being coupled to the draft links of a towing vehicle.

Draft tongues are used to couple machines to vehicles, for example, agricultural tractors, in order to be able to pull them across a field, a street or the like. If the machine, for example, a mower, is also powered during the travel, then an articulated power take-off (PTO) shaft or the like usually extends to the vehicle in order to be able to transmit power. During travel around curves the relative position between the machine and therewith its draft tongue and PTO shaft on the one hand and the vehicle on the other hand changes. As soon as the PTO shaft exceeds an angle of a certain amount with its driven shaft due to the travel around a curve, trouble free transmission of torque is no longer possible.

In order to avoid problems in the transmission of torque during travel around a curve, it has been proposed (U.S. Pat. No. 4,525,987 granted on Jul. 2, 1985 and U.S. Pat. No. 4,738,461 granted on Apr. 19, 1988) that the implement include a pivoting drive having two drive housings that can pivot with respect to each other about a vertical axis, where the input side of the drive housing is constantly oriented towards the vehicle by a coupling arrangement; for this purpose it is connected to a pivoting hitch or to the lower draft links or arms of a three-point implement hitch.

Due to cost limitations, other machines do not use a pivoting drive, and the distance between the connecting points of the articulated PTO shaft is made as large as possible in order to keep its deviation from the extended line as low as possible. In this case the draft tongue has an articulated connection with the tractor hitch.

SUMMARY OF THE INVENTION

According to the present invention, there is provided an improved draft tongue for a powered implement or machine.

An object of the invention is to provide a draft tongue that is suitable for machines powered by differing means.

More specifically, it is an object of the present invention to provide a draft tongue which can accept either a coupling arrangement at a downwardly directed mounting flange, provided at the forward end of the implement draft tongue, which accommodates an articulated shaft separated from the power transmission shaft or which accommodates a drive transmission case that permits a pivoting motion about an upright axis and transmits power through an angle.

A more specific object of the invention is to provide a combined drive retainer and tongue parking stand, spaced rearwardly on the draft tongue from the mounting flange, which has alternate couplings for supporting the implement drive line when the latter is adapted for being coupled either directly to the tractor PTO or is connected to the output shaft of the drive embodied in the pivotal transmission case.

These and other objects of the invention will become apparent from a reading of the ensuing description together with the appended drawings.

BRIEF DESCRIPTION OF THE DRAWINGS

FIG. 3 shows a side view of the forward section of the draft tongue with a ball joint connector.

DESCRIPTION OF THE PREFERRED EMBODIMENT

Figure 1:
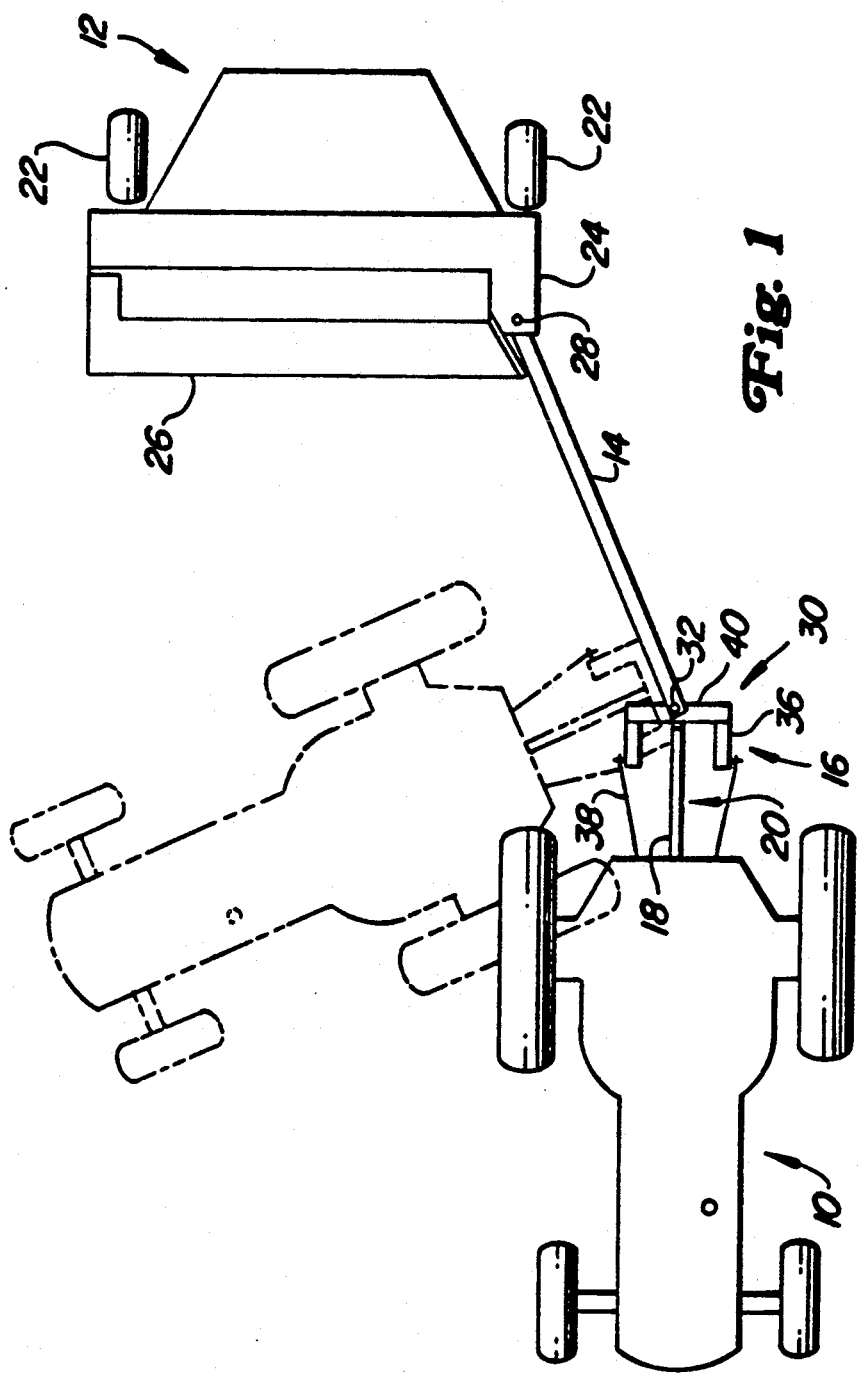
FIG. 1 shows a somewhat schematic plan view of a vehicle and a machine that are connected by a draft tongue according to the invention.

In FIG. 1 a vehicle 10 can be seen that pulls a machine 12 behind it and is connected to it for this purpose by a draft tongue 14 constructed according to the invention.

Figure 2:
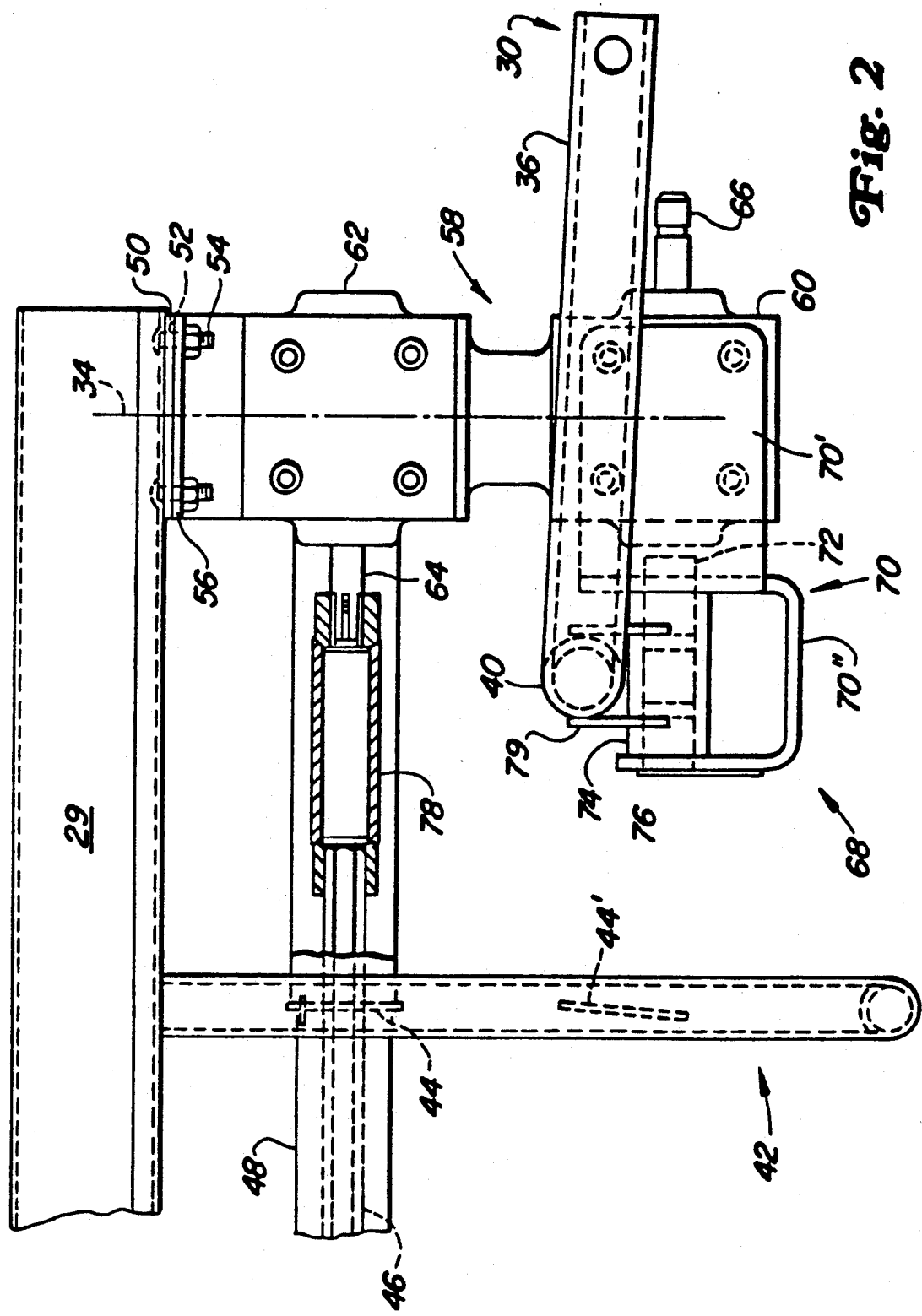
FIG. 2 shows a side view of a front section of the draft tongue with a drive transmission.

The vehicle 10 is shown as an agricultural tractor and may equally well be a tracked vehicle or the like. On the rear side of the vehicle 10 a conventional three-point implement hitch 16 is provided, as is well known. Finally in the area of the three-point hitch a power take-off shaft 18 is located to which a power shaft 20 can be rigidly attached, the power shaft 20 having universal joints at its opposite ends for providing articulation with only the rear universal joint being shown (FIG. 2).

Normally, that is, during straight-line travel, the vehicle 10 takes the attitude relative to the machine 12 that is shown in solid lines; during travel around a curve, however, the vehicle 10 changes its position relative to the machine 12, for example, a curve to the right, as is shown in dashed lines.

The machine 12 shown in the drawing is a mower. It may equally well be a mower-spreader, a forage harvester, a power-driven ground-breaking implement or any other type of agricultural or industrial implement. The machine 12 can be moved across the ground, supported on wheels 22 that are attached to a frame 24, and that are free to rotate, where conventionally the position of the wheels 22 can be varied in height relative to the frame 24, in order to change the position relative to the ground of the mower arrangement 26, carried by the frame 24 in this embodiment. If required, the adjustment of the wheels 22 is performed by hydraulic motors, not shown. Furthermore an upright coupling pin 28 is provided on the frame 24, in order to retain the draft tongue 14, so that it can pivot horizontally. Between the draft tongue 14 and the frame 24 there is also an adjusting arrangement, not shown but well known in itself, by means of which the sideways relationship of the machine 12 to the vehicle 10 can be changed.

The draft tongue 14 normally comprises a beam 29 configured as a straight hollow section, and is retained by the pin 28 at its rear end, while its forward end engages the three-point implement hitch 16 through a coupling arrangement 30. Since the train formed by the vehicle 10 and the machine 12, as can be seen in FIG. 1, is to be able to travel around curves, an upright pivot pin 32 is provided between the coupling arrangement 30 and the draft tongue 14, which permits a pivoting motion about a vertical axis 34 (FIG. 2).

In the example shown in FIG. 1, the coupling arrangement 30, exhibits two arms 36 that can be attached to the lower draft links or arms 38 of the three-point implement hitch 16. A cross member 40 extends between the two arms 36, which permits the connection to the tongue 14.

Now referring to FIG. 2, there is shown a retainer 42 extending downward from the beam 29 at some distance from the forward edge of the tongue 14, and which in this embodiment consists of a U-shaped tube, the free ends of whose legs are welded or bolted to the underside of the beam 29. In the space between the legs, an upper and a lower bearing plate 44, 44' with bores is inserted, through which a power transmission shaft 46 with a protective tube 48 extends and which are attached to the retainer 42. In the embodiment according to FIG. 2, the power transmission shaft 46 extends through the upper bearing plate 44, and in the embodiment according to FIG. 3, it extends through the lower bearing plate 44'. The upper bearing plate 44 extends parallel to the longitudinal axes of the legs; the lower bearing plate extends at slight inclination thereto. The retainer 42 also serves as a parking stand and for this purpose the bottom of the "U" between the legs forms the foot of the stand, so that the tongue 14 with the retainer 42 can be deposited on the ground.

A first flange 50 is welded to the underside of the beam flush with its forward edge, which, in the configuration shown, consists of a four-cornered plate with several holes 52 that accept bolts 54. A second flange 56 can be rigidly attached to the first flange 50 with the bolts 54.

According to FIG. 2, the second flange 54 holds a drive 58 that consists of two generally similar drive housings 60 and 62. The drive 58 is configured as a pivoting drive and is in itself well known and arranged such that the lower drive housing 60 can pivot horizontally with respect to the upper drive housing 62 about the vertical axis 34. For this purpose, it is supported in bearings, not shown, for free pivotal movement in the upper drive housing 62.

Instead of using two drive housings 60, 62 pivoted with respect to each other, the power could be transmitted by several angle joints that are retained at the second flange 58 and are able to pivot horizontally.

An output shaft 64 is aligned with the power transmission shaft 46, extends from the upper, rigid drive housing 62 and is connected to the power transmission shaft 46 by a sleeve 78. An input shaft 66 extends forwardly from the lower, pivoted drive housing 60 that can be connected through the articulated shaft 20 (FIG. 2) with the power take-off shaft 18. An angle drive, not shown, is provided in each of the two drive housings 60, 62 which carry the power flow from the input shaft 66 to the output shaft 64.

In the lower drive housing 60 opposite the input shaft 66 a bearing support 68 is located, including a carrier 70, a pivot pin 72 and a bearing sleeve 74.

The carrier 70 is configured as a double U-shaped bracket including a first U-shaped portion 70' having forwardly extending legs located on opposite sides of the lower drive housing 60 and bolted to its opposite side surfaces. The carrier 70 includes a second U-shaped portion 70" of transverse orientation and having upwardly directed legs, the forward one of which also forms the vertically directed bottom between the two legs of the first U-shaped portion 70' and retains the second U-shaped portion 70" between the lower drive housing 60 and the retainer 42, as seen in FIG. 2.

Fore-and-aft aligned bores 76 are respectively provided in the two legs of the first U-shaped portion 70' and have the pivot pin 72 received therein and fixed axially. The pivot pin 72 extends horizontally or generally horizontally in the plane of symmetry of the assembly consisting of the lower drive housing 60 and the coupling arrangement 30.

The bearing sleeve 74 is mounted on the pivot pin 72 for free pivotal movement, and carries an upwardly directed fork 79 which rigidly secures the sleeve to the cross member 40 of the coupling arrangement 30.

After all that it can be seen that the coupling arrangement 30 can pivot vertically about the pivot pin 72, and pivot horizontally, together with bracket 70 and the lower drive housing 60, about the vertical axis 34.

Thus, it will be appreciated that the entire assembly consisting of the two drive housings 60, 62, the bearing support 68 and the coupling arrangement 30 represents a single unit that is rigidly attached to the first flange 50 by way of the second flange 56 and bolts 54.

In order to operate the machine or implement 12, the coupling arrangement 30 thereof is connected to the lower draft links 38 of the tractor three-point hitch 16 which is adjustable in height with respect to ground. In addition, the drive is transmitted through the power take-off shaft 18, the articulated shaft 20, the input shaft 66, the angle joints contained in the drive housings 60, 62, the output shaft 64, the sleeve 78 and the power transmission shaft 46 to the mower arrangement 26. If the vehicle 10 travels around a curve, the coupling arrangement 30 with the lower drive housing 60 pivots horizontally with respect to the upper drive housing 62 and, hence, with respect to the drawbar 14, about the vertical axis 34.

Referring now to FIG. 3, there is shown an alternate way of hitching the implement 12 to the vehicle 10 in the absence of using the pivotable drive 58. The drawbar 14, the first flange 50, the retainer 42 and the bearing plate 44' in the embodiment shown in FIG. 3 correspond to those shown in FIG. 2. However, the power transmission shaft 46, unchanged in length, with its protective tube 48 is now no longer located in the upper bearing plate 44, but is retained in the lower bearing plate 44' and connected at its forward end directly to the articulated shaft 20. Accordingly the power transmission shaft 46 is no longer parallel to the beam 29, but is inclined to it at a small angle.

The second flange 56 is in itself congruent to the first flange 50, but it carries a housing 80 extending downward, in which a pin 82 is retained in disposition along a vertical axis.

The pin 82 extends downwardly beyond the housing 80 and engages a ball joint 84 in its section outside the housing 80 which connects with an elongate coupling member 86 of the coupling arrangement 30', the member 86 being in the form of a rod or bar having opposite ends adapted for being coupled to the draft links of the towing vehicle.

The ball joint 84 consists of a ball 88 that is retained in a socket 90, free to pivot in any direction but secured against loss, where the ball 88 is rigidly connected to the pin 82 and the socket 90 is rigidly connected to the coupling member 86. The ball 88 could also form an integral part of the pin 82.

In this embodiment the coupling arrangement 30', which can pivot to an unlimited degree horizontally and to a limited degree vertically, is connected by means of the second flange 56 through the coupling member 86 to the drawbar 14.

The machine 12 can now be operated by connecting it through the coupling member 86 to the vehicle 10 and powered directly by the articulated shaft 20.

FIGS. 2 and 3 clearly illustrate the fact that the second flange 56 can be rigidly bolted to the first flange 50 either with the drive 58 and the coupling arrangement 30 or with the coupling member 86, in order to establish a connection between the vehicle 10 and the machine 12.

We claim:

1. In a powered implement including an elongate draft tongue extending forwardly from a main frame of the implement and having a coupling arrangement at its forward end adapted for being coupled to draft links of a towing vehicle, and a power shaft supported by the tongue rearwardly of its forward end, the improvement comprising: said coupling arrangement including a first mounting flange fixed to a forward location of the tongue; a second flange releasably secured to the first flange and forming part of one of either a transmission structure having an outlet shaft coupled to the power shaft and an inlet shaft mounted for pivoting relative to the outlet shaft about a generally vertical axis and being adapted for being coupled to said draft links, or of a universal joint assembly including a first joint part carried by said second flange, an elongate coupling member having opposite ends adapted for coupling to said draft links and a second joint part carried by the coupling and connected to and cooperating with said first part to form a universal joint.

2. The powered implement defined in claim 1 and further including a parking stand fixed to and depending from said tongue at a location spaced behind said first flange; said parking stand also serving as a support for said drive line and for this purpose including an upper support plate, which supports the drive line in alignment with said output shaft when said first flange forms part of said transmission structure, and a lower support plate, which supports the drive line at a location adapted for being coupled to a power take-off shaft of the towing vehicle.

3. The powered implement defined in claim 2 wherein said parking stand is U-shaped and has upper ends of opposite legs thereof fixed to said tongue; and said upper and lower support plates extending between and being fixed to said legs.

4. The powered implement defined in claim 3 wherein said upper support plate lies in a vertical plane containing respective centerlines of said legs and wherein said lower support plate is tilted slightly rearwardly from top to bottom relative to said plane.

5. The powered implement defined in claim 1 wherein said second flange forms part of said transmission structure; said transmission structure including a first drive housing mounted to said second flange and containing said output shaft and including a second drive housing containing said input shaft and being mounted to the first drive housing for pivoting relative to said first drive housing about said vertical axis.

6. The powered implement defined in claim 5 wherein said coupling arrangement further includes a U-shaped member having opposite legs disposed on opposite sides of the second drive housing, with said legs having forward ends adapted for connection to said vehicle draft links; a pivot pin support structure being secured to said second drive housing and extending therebehind; a pivot pin being carried by said pivot pin support and oriented along a fore-and-aft extending axis; and said U-shaped member being coupled to said pivot pin for pivoting about said fore-and-aft extending axis.

7. The powered implement defined in claim 1 wherein said first mounting flange is fixed to the underside of said tongue.

8. The powered implement defined in claim 1 wherein said first part of the universal joint includes a pin carried by said second flange and a ball supported by said pin; and said second part of the universal joint including a socket carried by the elongate coupling member and having said ball received therein to thus form a ball joint.

* * * * *